United States Patent
Terada

(10) Patent No.: US 7,421,324 B2
(45) Date of Patent: Sep. 2, 2008

(54) DRIVE SYSTEM SWITCHING CONTROL METHOD

(75) Inventor: Eiichi Terada, Tochigi (JP)

(73) Assignee: Showa Corporation, Saitama (JP)

( * ) Notice: Subject to any disclaimer, the term of this patent is extended or adjusted under 35 U.S.C. 154(b) by 101 days.

(21) Appl. No.: 10/737,417

(22) Filed: Dec. 15, 2003

(65) Prior Publication Data
US 2004/0254704 A1    Dec. 16, 2004

(30) Foreign Application Priority Data
May 26, 2003   (JP) .............................. 2003-147381

(51) Int. Cl.
*G06F 17/00* (2006.01)
(52) U.S. Cl. .................... 701/41; 180/233; 180/247; 180/249; 701/69; 701/89
(58) Field of Classification Search ............ None
See application file for complete search history.

(56) References Cited

U.S. PATENT DOCUMENTS

| 4,566,554 A | * | 1/1986 | Suzuki ............ 180/249 |
| 4,576,061 A | * | 3/1986 | Yamakawa et al. ....... 180/233 |
| 4,609,064 A | * | 9/1986 | Suzuki et al. ............ 180/233 |
| 4,792,009 A | * | 12/1988 | Iritani ................ 180/233 |
| 5,819,194 A | * | 10/1998 | Hara et al. ............. 701/89 |
| 5,906,645 A | * | 5/1999 | Kagawa et al. ............ 701/23 |

FOREIGN PATENT DOCUMENTS

| JP | 264091 | 9/2000 |
| JP | 260694 | 9/2001 |

* cited by examiner

*Primary Examiner*—Khoi H. Tran
*Assistant Examiner*—Marie A Weiskopf
(74) *Attorney, Agent, or Firm*—Orum & Roth LLC

(57) ABSTRACT

In a drive system switching control method of an automotive four-wheeled vehicle for switching two drive systems comprising a two-wheel drive and a four-wheel drive. The method has a step of detecting a steering angle, and a step of inhibiting the drive system switching if the detected steering angle is over a predetermined angle.

3 Claims, 16 Drawing Sheets

DRIVE SYSTEM SWITCHING CONTROL METHOD

BACKGROUND OF THE INVENTION

1. Field of the Invention

The present invention relates to a drive system switching control method of an automotive four-wheeled vehicle which can switch between two drive systems comprising a two-wheel drive and a four-wheel drive.

2. Description of the Related Art

With respect to a switching apparatus of an automotive four-wheeled vehicle which can switch between two drive systems comprising the two-wheel drive and the four-wheel drive, the drive system is normally switched by always connecting one of either the front wheels or the rear wheels to a drive source and switching another thereof based on engaging and disengaging a clutch mechanism.

In order to engage and disengage the clutch mechanism, there is an example in which a driver manually engages and disengages the clutch mechanism. See Japanese Patent Application Laid-Open No. 2000-264091 reference document 1. There is another example in which an electromagnetic coil or the like engages and disengages the clutch mechanism. Japanese Patent Application Laid-Open No. 2001-260694 reference document 2.

The former reference document 1 corresponds to a prior application filed by the same applicant as the applicant of the present application. The structure is made such that the drive system is switched by oscillating an operation lever so as to drive a drive system switching clutch mechanism. However, this document does not disclose a structure for inhibiting the switching operation.

In the latter reference document 2, the structure is made such that an electromagnetic clutch is comprised of a clutch plate and an electromagnetic coil. A drive switching apparatus is operated based on an operation of the electromagnetic clutch so as to connect and disconnect between a drive shaft and a driven shaft and switch the drive system. However, with respect to the control of the electromagnetic clutch, this document only discloses that the driven shaft is disconnected from the drive shaft when braking the vehicle.

When switching the drive system, since the driven wheel becomes the drive wheel, or on the contrary, the drive wheel becomes the driven wheel, some motion is generated in the traveling vehicle body.

If this motion is generated during a turning travel, an attitude of the vehicle body is affected so as to become unstable. Accordingly, this motion is not desirable.

SUMMARY OF THE INVENTION

In view of the above, an object of the present invention is to provide a drive system switching control method of an automotive four-wheeled vehicle by which a vehicle can travel while always keeping a vehicle body in a good attitude and in a dynamically balanced position turning, while at the same time stably maintaining the good attitude.

The present invention relates to a drive system switching control method of an automotive four-wheeled vehicle for switching two drive systems comprising a two-wheel drive and a four-wheel drive. The drive system switching control method comprises the steps of detecting a steering angle and inhibiting the drive system switching if the detected steering angle is beyond a predetermined angle.

Since the switching of the drive system is inhibited at the time the vehicle turns such that the angle of steering is more than the predetermined angle, the motion by the switching does not have an adverse effect on the turning vehicle body. It is possible to drive the vehicle while always keeping the vehicle body in a good attitude and in a dynamically balanced position, while at the same time stably maintaining the good attitude.

The present invention relates to a drive system switching control method of an automotive four-wheeled vehicle for switching two drive systems comprising a two-wheel drive and a four-wheel drive. The drive system switching control method comprises the steps of detecting a steering angle and a vehicle speed, comparing the detected steering angle and vehicle speed with a corresponding relationship between the steering angle and the vehicle speed allowing a predetermined drive system switching so as to determine whether or not the drive system switching is allowed, and inhibiting the drive system switching if it is determines that the drive system switching is not allowed.

The drive state at the angle of steering and the vehicle speed by which the vehicle body motion is not generated by switching the drive system is previously determined. The switching of the drive system is inhibited at the time of comparing the detected angle of steering with the vehicle speed and determining that the switching of the drive system is not allowed. The motion by switching the drive system does not have an effect on the turning vehicle body. It is possible to drive the vehicle while always keeping the vehicle body in a good attitude and in a dynamically balanced position, while at the same time stably maintaining the good attitude.

The present invention relates to a drive system switching control method of an automotive four-wheeled vehicle for switching two drive systems comprising a two-wheel drive and a four-wheel drive. The drive system switching control method comprises the steps of detecting a steering angle and a vehicle speed, and comparing the detected vehicle speed with a relationship of an allowable steering angle allowing the drive system switching in correspondence to a predetermined vehicle speed so as to determine an allowable steering angle in correspondence to the vehicle speed. The drive system switching is inhibited if the detected steering angle is over the determined allowable steering angle.

The relationship of the allowable angle of steering in correspondence to the vehicle speed by which the vehicle body attitude is not affected by switching the drive system is previously determined. The switching of the drive system is inhibited at the time of comparing the vehicle speed detected by the relationship. The allowable angle of steering is determined in correspondence to the vehicle speed. Where the detected angle of steering is more than the determined allowable angle of steering, the motion by switching the drive system does not have an effect on the turning vehicle body. It is possible to drive the vehicle while always keeping the vehicle body in a good attitude, and in a dynamically balanced position while at the same time stably maintaining the good attitude.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
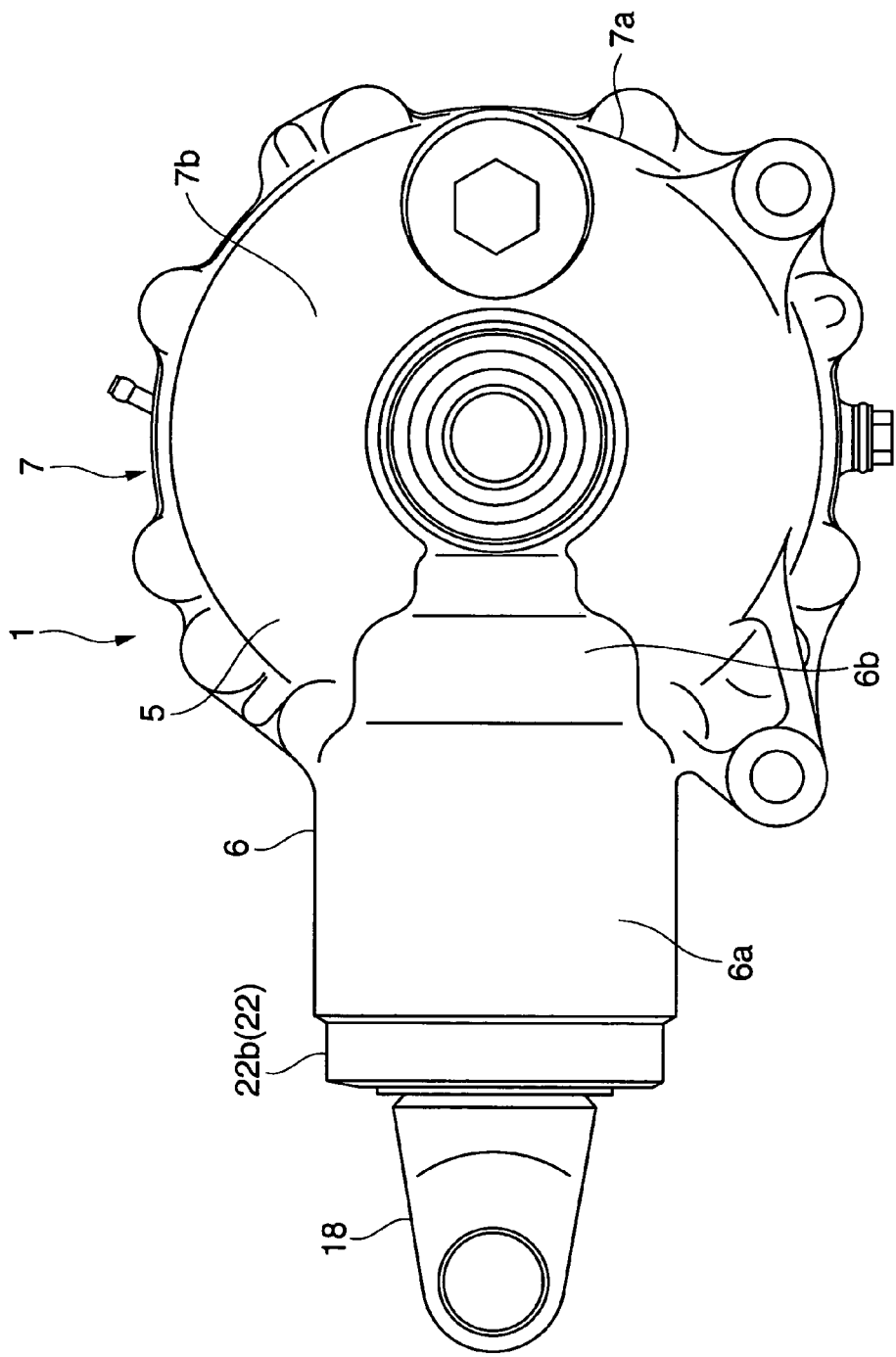
FIG. 1 is a left side elevational view of a drive transmission apparatus in which a drive system switching clutch mechanism in accordance with an embodiment of the present invention is installed.
Figure 2:
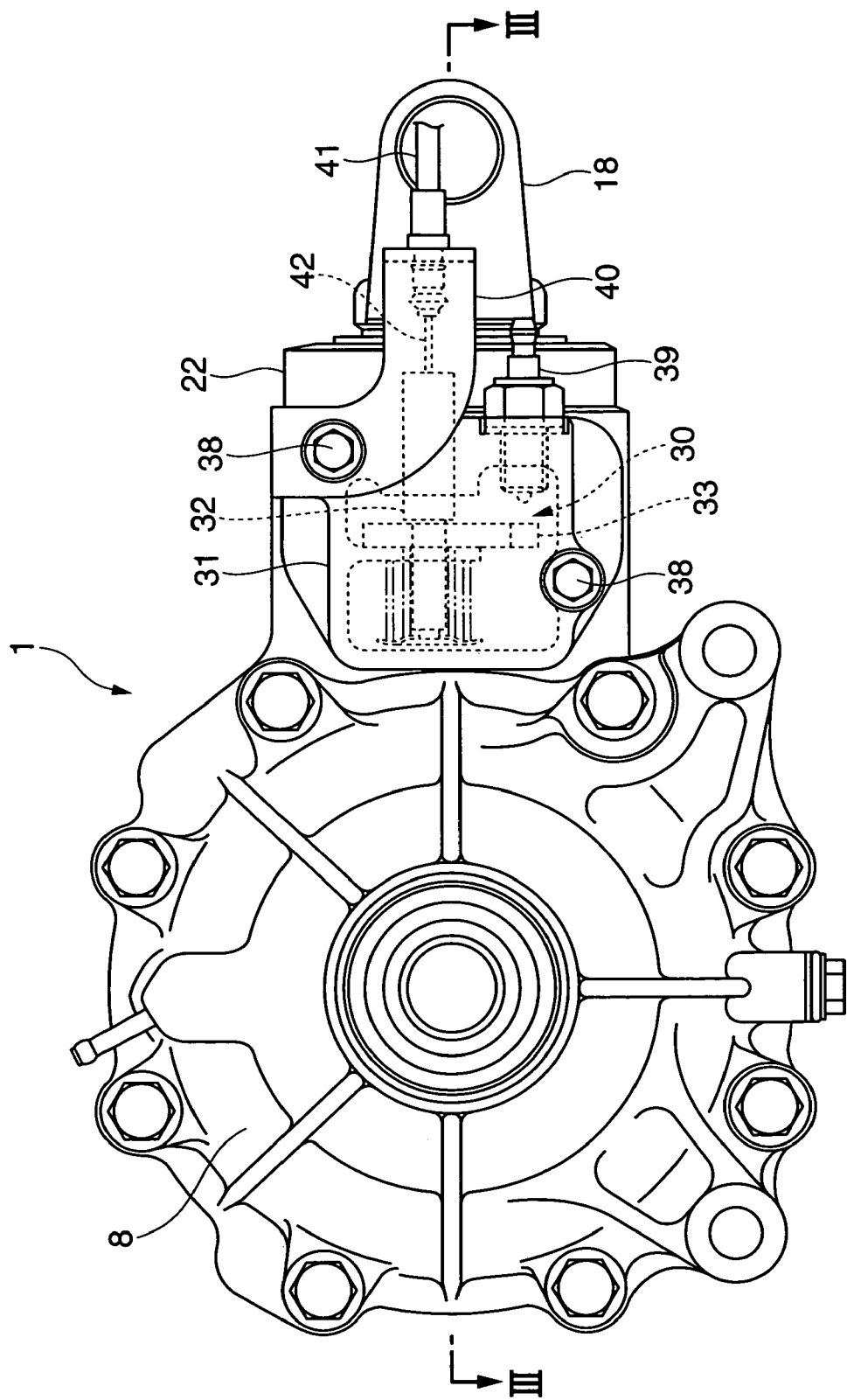
FIG. 2 is a right side elevational view of the drive transmission apparatus in FIG. 1.

A description will be given below of an embodiment in accordance with the present invention with reference to FIGS. 1 to 14.

An automotive four-wheeled vehicle in accordance with the present embodiment is a bar handle type buggy four-wheeled vehicle. It is provided with a drive transmission apparatus 1 in which a drive system switching clutch mechanism 2 and a differential mechanism 3 in a rear wheel side are integrally assembled.

The drive transmission apparatus 1 has approximately the same structure as the drive transmission apparatus in accordance with the prior application filed by the same applicant of the present application. The description is given of the drive transmission apparatus 1 by showing a left side elevational view in FIG. 1, a right side elevational view in FIG. 2, and a cross sectional view in FIG. 3 (a cross sectional view cut along a line III-III in FIG. 2).

A gear case 5 is structured such that a clutch case 6 in a front half portion and a differential carrier 7 in a rear half portion are integrally formed. The clutch case 6 is formed approximately in a closed-end cylindrical shape by a cylinder portion 6a and a rear bottom end portion 6b. The differential carrier 7 formed in a closed-end cylindrical shape is integrally formed in an extending manner in the rear bottom end portion 6b by a flat cylinder portion 7a and a hollow left bottom end portion 7b.

The clutch case 6 and the differential carrier 7 are structured such that the rear bottom end portion 6b and the left bottom end portion 7b are integrally connected to each other. A cylindrical center shaft of the clutch case 6 is directed in a longitudinal direction, and a cylindrical center shaft of the differential carrier 7 is directed in a lateral direction. Both the clutch case 6 and the differential carrier 7 are orthogonal.

The clutch mechanism 2 is received in an inner portion of the clutch case 6. A hollow differential carrier cover 8 is combined to form a right side in such a manner as to cover a right circular opening of the differential carrier 7. The differential mechanism 3 is received in an inner portion thereof.

Figure 3:
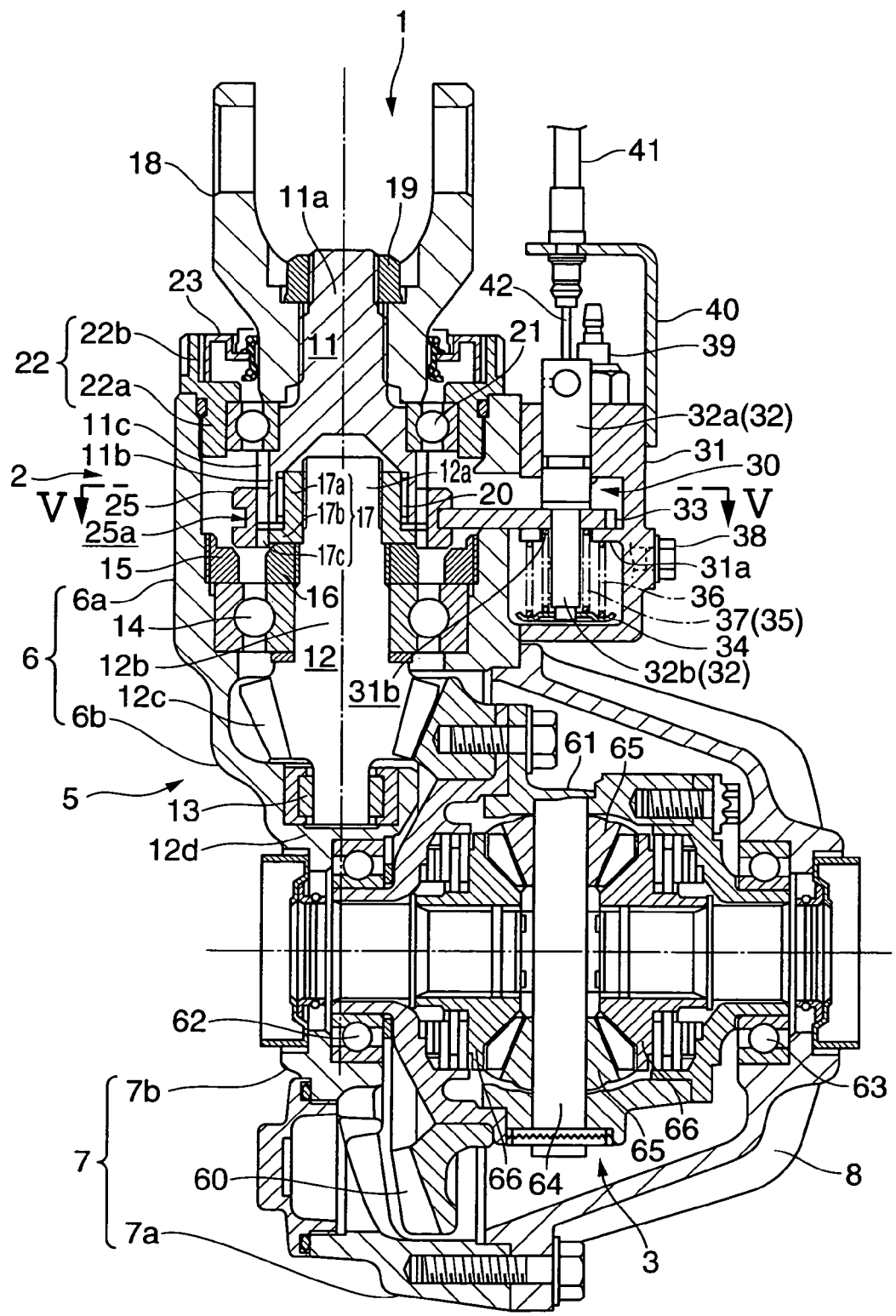
FIG. 3 is a cross sectional view cut along a line III-III in FIG. 2.

With reference to FIG. 3, the differential mechanism 3 is structured such that a laterally combined differential case 61 integrally formed with a ring gear 60 is rotatably supported within the differential carrier 7 and the differential carrier cover 8 around a center shaft directed in the lateral direction by ball bearings 62 and 63.

A pair of pinion gears 65 and 65 are rotatably pivoted to a pinion shaft 64 provided orthogonally to the center shaft within the differential case 61. A pair of side gears 66 and 66 engaging with the respective pinion gears 65 and 65 in a bevel gear manner are rotatably supported to right and left sides of the pinion shaft 64.

Right and left axle shafts are spline fitted respectively to the side gears 66 and 66.

On the other hand, the clutch mechanism 2 is structured such that an input shaft 11 and an output shaft 12 of the clutch mechanism 2 are coaxially pivoted longitudinally to the clutch case 6.

With reference to FIG. 3, the output shaft 12 is structured such that a spline shaft portion 12a, a cylinder portion 12b, a pinion gear 12c and a cylinder end portion 12d are formed in an axial direction in sequence from a front side to a rear side.

The structure is made such that the pinion gear 12c of the output shaft is engaged with the ring gear 60 of the differential mechanism 3, whereby power is transmitted to the differential mechanism 3.

The rear bottom end portion 6b of the clutch case 6 is structured such that an outer diameter is reduced in two stages so as to be formed in a tapered shape toward a back side. A roller bearing 13 is interposed in a portion having a reduced inner diameter at a rear end of the rear bottom end portion 6b. The cylindrical end portion 12d of the output shaft 12 is pivoted thereto. The cylinder portion 12b of the output shaft 12 is pivoted to a ball bearing 14 interposed in the cylinder portion 6a of the clutch case 6. Accordingly, the output shaft 12 is rotatably pivoted to the clutch case 6 by the roller bearing 13 and the ball bearing 14.

In this case, the ball bearing 14 is structured such that an outer race is fixed to the clutch case 6 by a lock nut 15, and an inner race is fixed to the output shaft 12.

A driven gear 17 is fitted to the spline shaft portion 12a of the output shaft 12 rotatably pivoted in this manner.

The driven gear 17 is structured such that a flange 17b is formed in a rear end portion of the cylinder portion 17a. A clutch gear tooth 17c directed in an axial direction is formed on an outer peripheral surface of the flange 17b.

On the other hand, the input shaft 11 is formed by a spline shaft portion 11a and a cylinder portion 11b expanded at a rear end and extending to a rear side in a cylindrical shape. A clutch gear tooth 11c directed in an axial direction is formed on an outer peripheral surface of the cylinder portion 11b so as to have the same diameter as that of the clutch gear tooth 17c of the driven gear 17.

A base end portion of a yoke member 18 is fitted to the spline shaft portion 11a, and the yoke member 18 is integrally fixed by a lock nut 19 screwed with a protruding end portion of the yoke member 18.

The cylinder portion 11b of the input shaft 11 is fitted to the cylinder portion 17a of the driven gear 17 fitted to the spline shaft portion 12a of the output shaft 12 via a roller bearing 20 from an outer side.

Further, a retainer 22 is screwed into a portion between a ball bearing 21 fitted around the base portion of the cylinder portion 11b of the input shaft 11 and an opening portion of the clutch case 6.

Accordingly, the input shaft 11 is positioned in the clutch case 6 via the retainer 22, is rotatably pivoted by the ball bearing 21, is coaxially positioned in the output shaft 12 via the driven gear 17, and is rotatably pivoted by the roller bearing 20.

The retainer 22 is structured such that a small-diameter portion 22a is inserted to a portion between the opening portion of the clutch case 6 and the ball bearing 21. A seal member 23 is interposed between a large-diameter portion 22b in an outer side of the opening portion of the clutch case 6 and the yoke member 18.

An end surface of the cylinder portion 11b of the input shaft 11 and the flange 17b of the driven gear 17 come close to and are opposed to each other. The clutch gear tooth 11c of the cylinder portion 11b and the clutch gear tooth 17c of the flange 17b have the same diameter and are coaxially arranged side by side in a longitudinal direction.

A clutch member 25 formed in a cylindrical shape and having an inner peripheral surface on which a clutch gear tooth is formed is engaged with the clutch gear tooth 11c of the cylinder portion 11b of the input shaft 11 so as to be slidable in an axial direction. When the clutch member 25 protrudes from the cylinder portion 11b so as to move to a rear side, the clutch member 25 is also engaged with the clutch gear tooth 17c of the driven gear 17 integrally formed with the output shaft 12 so as to connect the input shaft 11 and the output shaft 12. It is thereby possible to transmit rotation of the input shaft 11 to a side of the output shaft 12.

When the clutch member 25 is at a forward position at which the clutch member 25 does not protrude from the cylinder portion 11b, the input shaft 11 and the output shaft 12 are disconnected and the rotation of the input shaft 11 is not transmitted to the side of the output shaft 12.

As mentioned above, the input shaft 11 and the output shaft 12 are connected and disconnected at the sliding position of the clutch member 25 in an axial direction, a longitudinal direction.

An outer peripheral groove 25a is formed in a peripheral direction on an outer peripheral surface of the clutch member 25.

Figure 4:
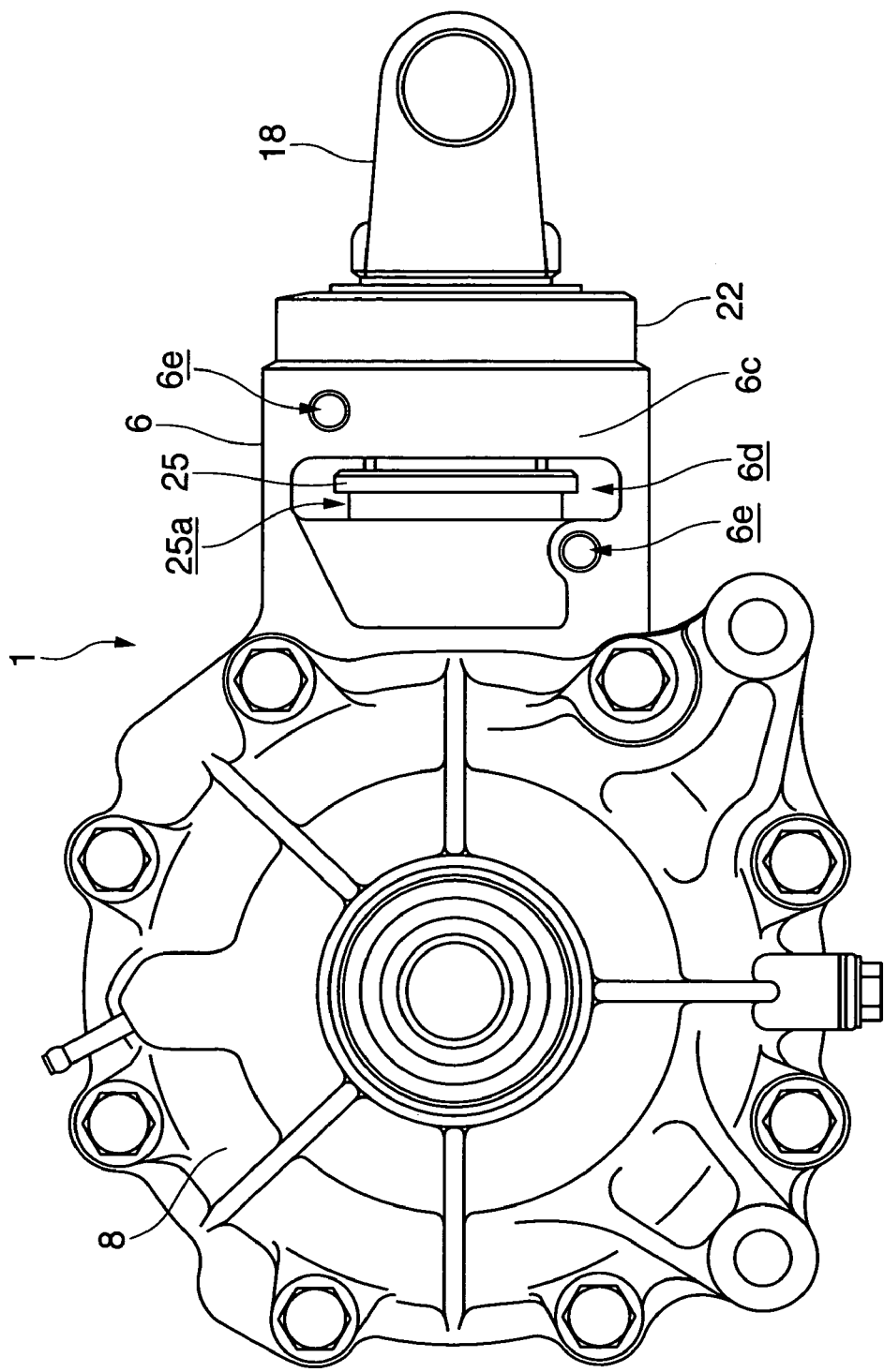
FIG. 4 is a right side elevational view of the drive transmission apparatus from which a fork driving mechanism is taken out.

A flat surface 6c is formed on a right side surface of the cylinder portion 6a of the clutch case 6. A vertically oblong rectangular port 6d is formed on the flat surface 6c as shown in FIG. 4. The rectangular port 6d opposes to a sliding range of the outer peripheral groove 25a of the clutch member 25 in an axial direction.

In this case, bolt threaded holes 6e and 6e are formed on the flat surface 6c at front and rear opposing corner positions with respect to the rectangular port 6d.

A fork driving mechanism 30 is mounted to the flat surface 6c of the clutch case 6.

The fork driving mechanism 30 is put together into an approximately rectangular box-shaped support case member 31 so as to be united, and a left side opening end surface of an opening portion of the support case member 31 is brought into contact with the flat surface 6c of the clutch case 6 so as to be mounted.

Bolt holes are respectively pierced in portions of the support case member 31 in correspondence to the bolt threaded holes 6e and 6e. The support case member 31 is mounted by inserting bolts 38 and 38 to the bolt holes and bolt fastening to the bolt threaded holes 6e and 6e.

A large-diameter portion 32a of a fork shaft 32 extends through a thick front wall of the support case member 31 in a longitudinal direction so as to be slidably supported.

The fork shaft 32 is constituted by the large-diameter portion 32a and a small-diameter portion 32b. The small-diameter portion 32b extends outward to a rear side within the support case member 31 so as to extend through a base end portion of a fork member 33 and axially supports the fork member 33 slidably.

Figure 5:
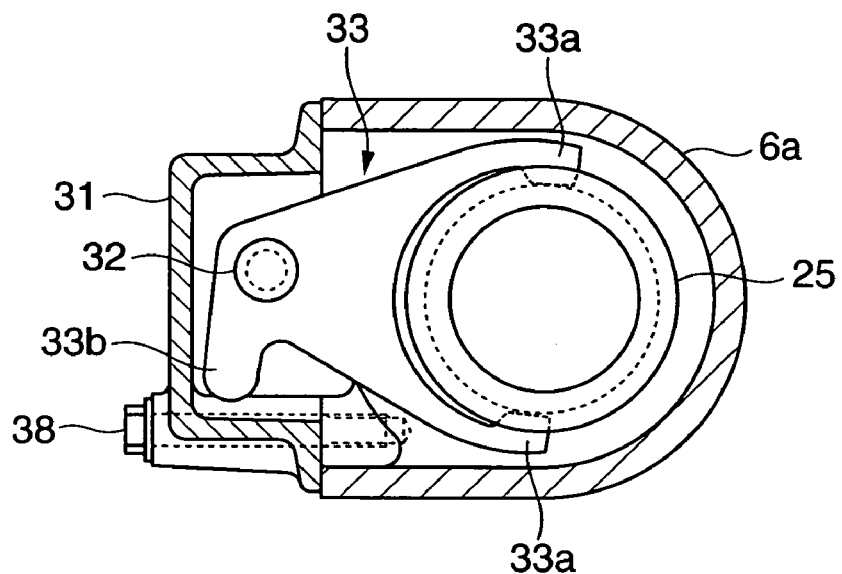
FIG. 5 is a cross sectional view cut along a line V-V in FIG. 3.
Figure 6:
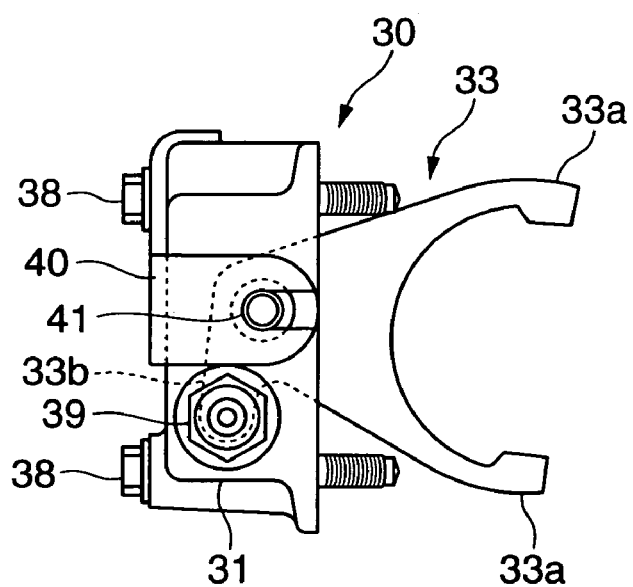
FIG. 6 is a front elevational view of the fork driving mechanism.
Figure 7:
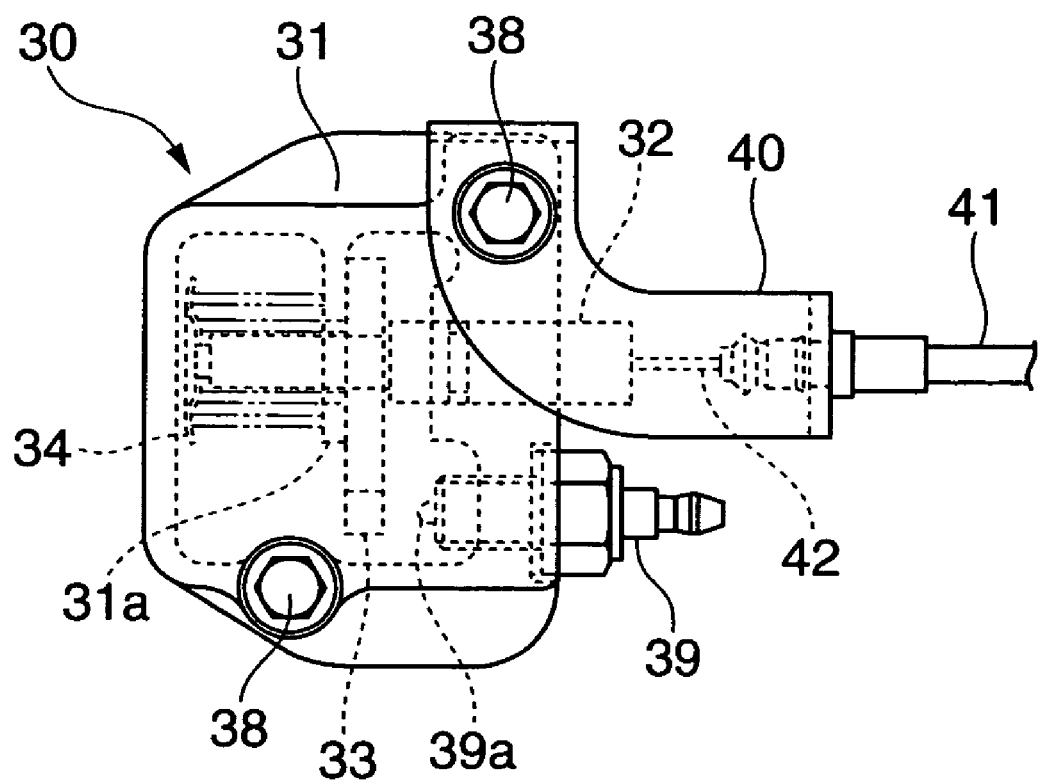
FIG. 7 is a side elevational view of the fork driving mechanism in FIG. 6.

The fork member 33 is formed in a plate shape, and is structured such that a pair of pawl portions 33a and 33a extend outward in a bifurcated manner so as to broaden toward the end from a base end portion passed through the fork shaft 32 as shown in FIGS. 5 and 6. A pair of pawl portions 33a and 33a are engaged with the outer peripheral groove 25a of the clutch member 25 so as to clamp the outer peripheral groove 25a from both sides.

In this case, the fork member 33 has another protruding portion 33b in an approximately perpendicular direction to the pawl portions 33a and 33a from the base end portion.

An inner wall 31a which is perpendicular to the fork shaft 32 is formed within the support case member 31. The small-diameter portion 32b of the fork shaft 32 passing through the fork member 33 further passes through a circular hole 31b pierced in the inner wall 31a.

Accordingly, the fork member 33 is pivoted in a penetrating manner to the small-diameter portion 32b of the fork shaft 32 between a front wall of the support case member 31 and the inner wall 31a.

A disc-like receiving plate 34 is firmly fixed to a rear end of the small-diameter portion 32b of the fork shaft 32, and a compression spring 36 is interposed between the receiving plate 34 and the inner wall 31a.

Further, the circular hole 31b of the inner wall 31a has a diameter which is one size larger than the small-diameter portion 32b of the fork shaft 32 passing through the circular hole 31b and has a gap with respect to the small-diameter portion 32b. Another compression spring 37 is interposed between the receiving plate 34 and the fork member 33 through the gap.

The compression spring 37 is arranged in an inner side of the compression spring 36, to form a structure for a load limiter mechanism 35 pressing the fork member 33.

A bracket 40 commonly fastened by one of the bolts 38 is provided in a side wall of the support case member 31. An end portion of a cover wire 41 is fitted and supported to an opposing position to the fork shaft 32 by the bracket 40.

An inner wire 42 protruding from the fitted end portion of the cover wire 41 is engaged with an end portion of the fork shaft 32.

In this case, a limit sensor 39 is fitted to a front wall of the support case member 31, and a working point 39a protruding to an inner portion of the case is opposed to the protruding portion 33b of the fork member 33 at a predetermined position.

The inner wire 42 and the like are assembled in the support case member 31 via the fork shaft 32, the fork member 33, the compression springs 36 and 37, the limit sensor 39 and the bracket 40 in the manner so as to structure the fork drive mechanism 30 as one unit.

The support case member 31, in which the fork drive mechanism 30 is united is brought into contact with the side surface of the clutch case 6. The fork member 33 protruding from the opening of the support case member 31 is inserted from the rectangular port 6d of the clutch case 6 at this time. A pair of pawl portions 33a and 33a are engaged with the outer peripheral groove 25a of the clutch member 25.

The support case member 31 is mounted to the side surface of the clutch case 6 by the bolts 38 and 38 in accordance with a bolt fastening arrangement.

The wire outer 41 extends to an operation lever 45 in a driver's seat.

Figure 8:
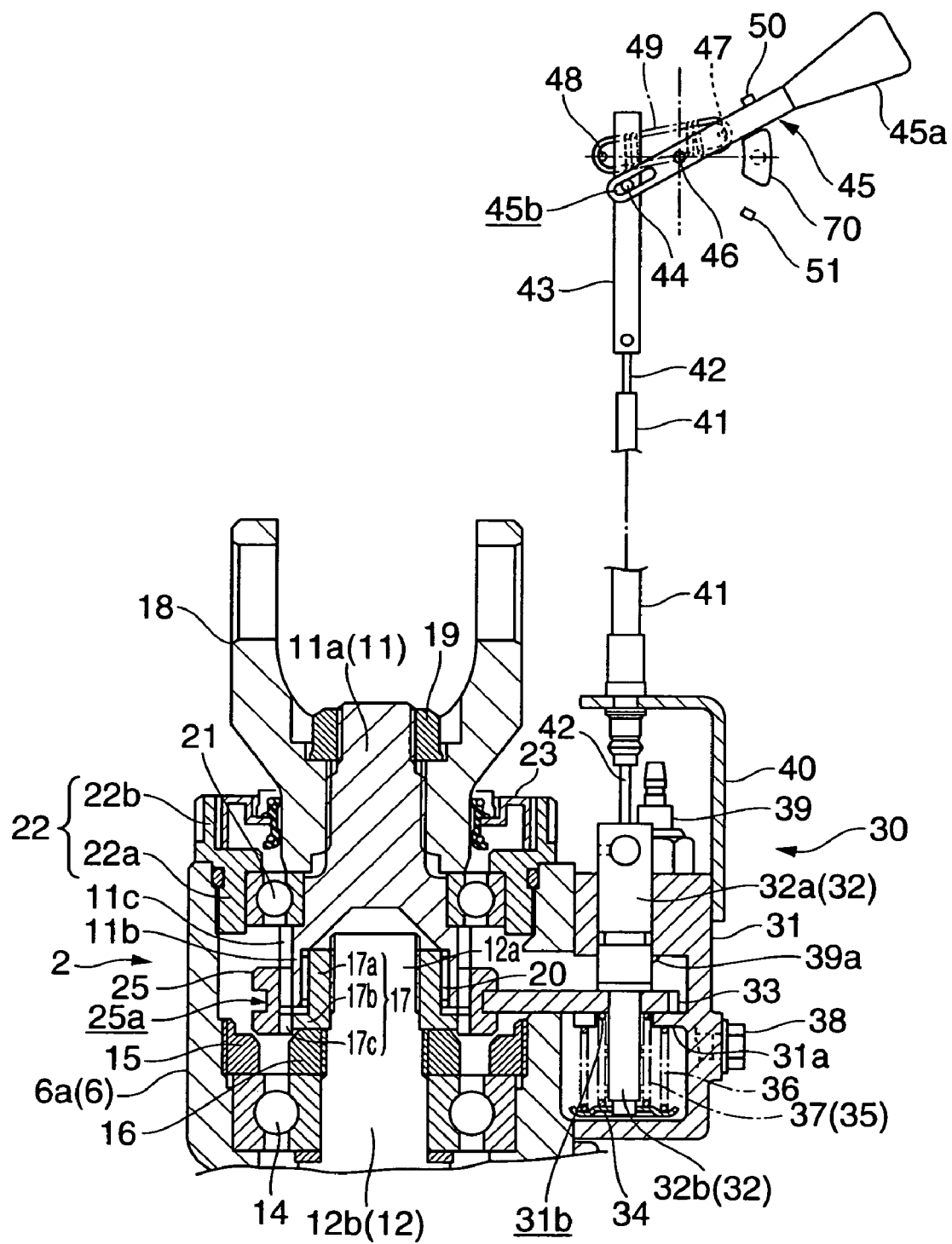
FIG. 8 is a view showing a cross sectional view of the drive system switching clutch mechanism and an operation lever.

As shown in FIG. 8, the operation lever 45 oscillates around a support shaft 46, and a long hole 45b is formed in an opposite side to an operation portion 45a with respect to the support shaft 46.

On the other hand, a long end member 43 connected to the inner wire 42 protruding from the cover wire 41 is supported so as to freely slide in a longitudinal direction. An engagement pin 44 provided in a protruding manner in the end member 43 is engaged with the long hole 45b of the operation lever 45.

The operation lever 45 is structured such that a pin 47 is provided in a protruding manner close to the operation portion 45a from the support shaft 46. A pin 48 is provided in a rising manner with respect to a vehicle body at an opposing predetermined position to the pin 47 with respect to the support shaft 46 when the operation lever 45 is perpendicular to the end member 43. A tensile spring 49 is interposed between both the pins 47 and 48.

In this case, an oscillating range of the operation lever 45 is restricted by stoppers 50 and 51.

In this case, a state illustrated in FIGS. 3 and 8 is a four-wheel drive state in which the clutch member 25 slidably engaging with the clutch gear tooth 11c in the side of the input shaft 11 of the clutch mechanism 2 moves to the rear side so as to be also engaged with the clutch gear tooth 17c in the side of the output shaft 12. In this manner, the input shaft 11 and the output shaft 12 are connected, and the power is transmitted to the differential mechanism 3.

Figure 9:
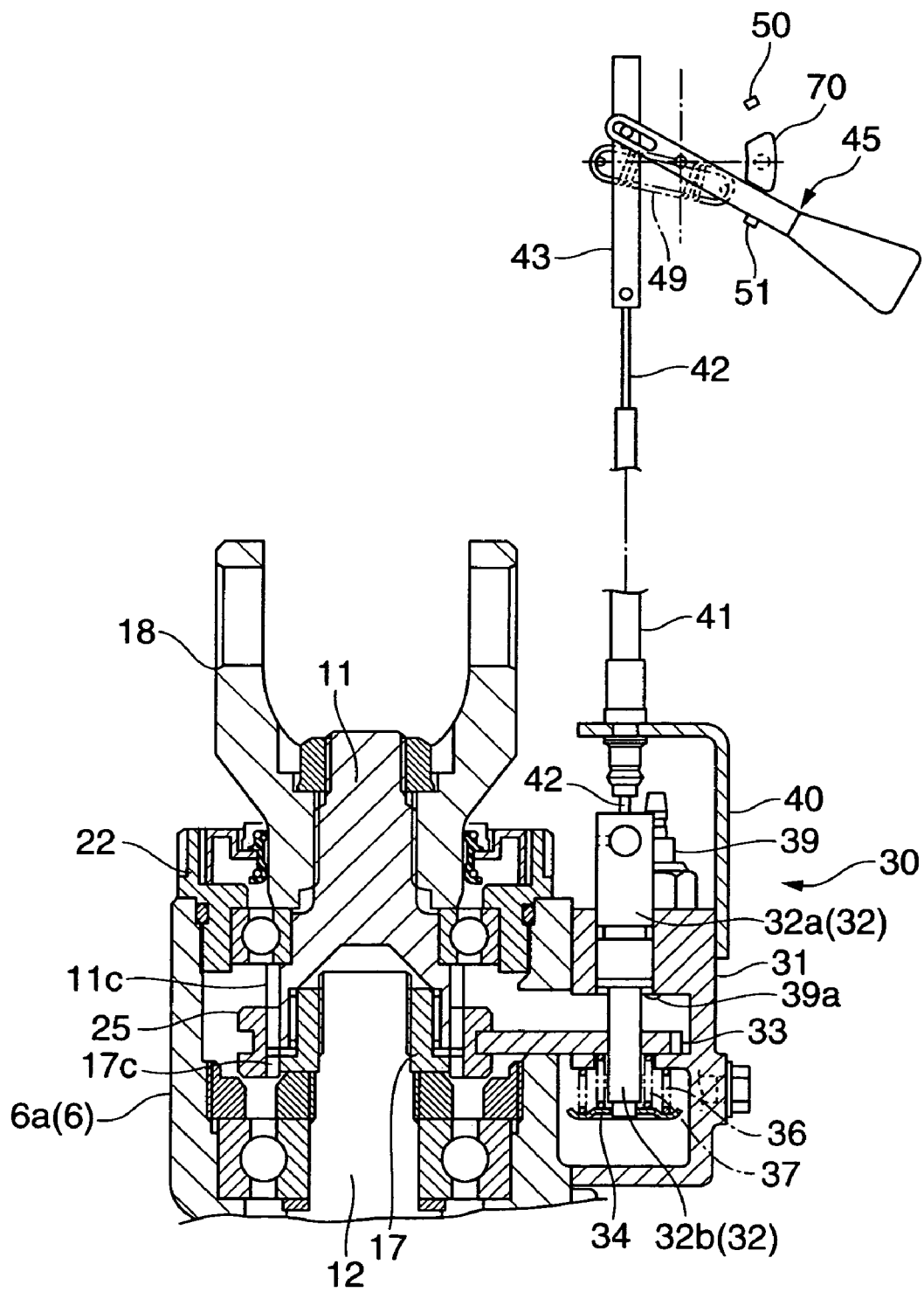
FIG. 9 is a view showing a cross sectional view of the drive system switching clutch mechanism when oscillating the operation lever in a clockwise direction, and the operation lever.

In this case, when oscillating the operation lever 45 in the clockwise direction as illustrated in FIG. 9, the oscillating position is maintained by the tensile spring 49 at a position where the operation lever 45 is brought into contact with the stopper 51. The inner wire 42 is pulled so as to move the fork shaft 32 to the front side.

The receiving plate 34 integrally moves forward based on the movement of the fork shaft 32 so as to further compress the compression springs 36 and 37. The inner compression spring 37 presses the fork member 33 to the front side. Accordingly, the fork member 33 is pressed by a restoring force of the compression spring 37 so as to move forward. A force more than the restoring force of the compression spring 37 is not applied to the fork member 33, and the load limit mechanism 35 is operated.

The compression spring 37 is set to be always operated within an elastic range. A limit load is determined based on a spring constant of the compression spring 37.

When a great load is applied to the output shaft 12 and a great relative rotating force is applied between the output shaft 12 and the input shaft 11, there is the condition that sliding friction of the clutch member 25 via both the elements is great and the clutch member 25 does not move easily. Accordingly, there is the condition that the fork drive mechanism is broken by operating the operation lever by an excessive force and pulling the inner wire so as to forcably move the clutch member 25. However, this problem can be solved by the load limit mechanism 35 as mentioned above.

Figure 10:
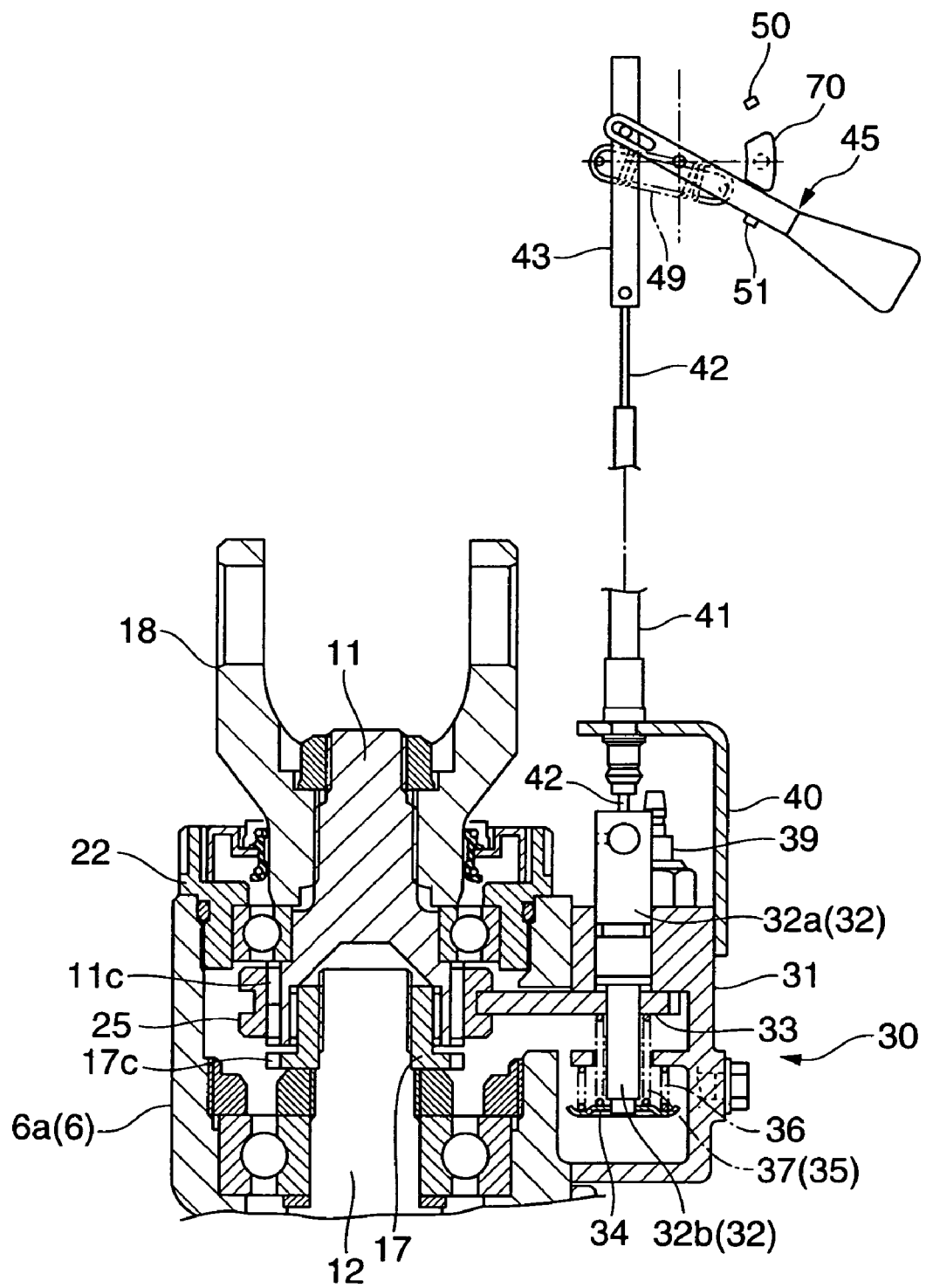
FIG. 10 is a view showing a cross sectional view of the drive system switching clutch mechanism in the next state and the operation lever.

The fork member 33 is pressed by the restoring force of the compression spring 37 and the clutch member 25 can move. The fork member 33 moves to the front side together with the clutch member 25 by the compression spring 37 as shown in FIG. 10, cancels the engagement with the clutch gear tooth 17c in the output side and disconnects between the input shaft 11 and the output shaft 12 so as to switch to a two-wheel drive state.

Figure 11:
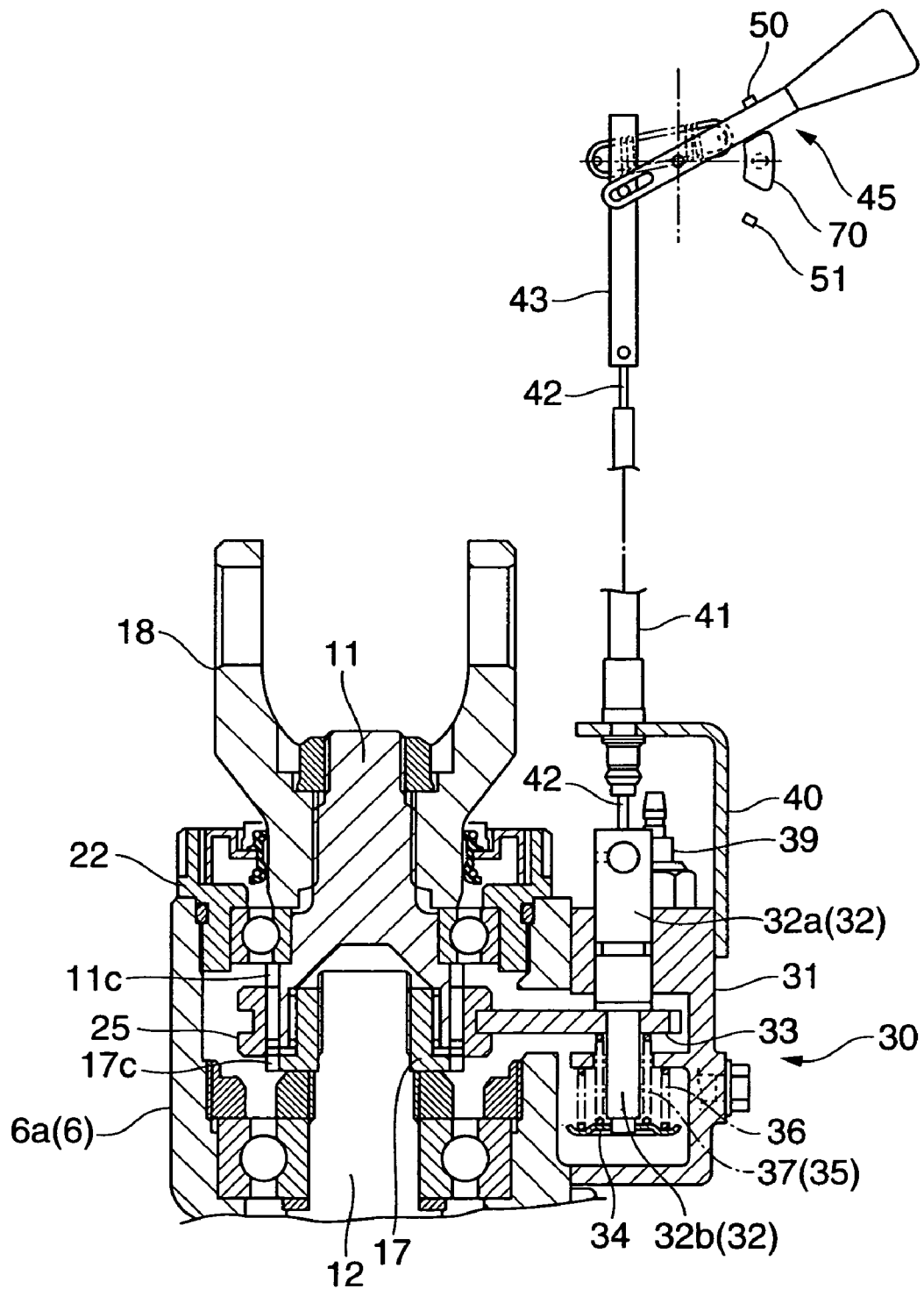
FIG. 11 is a view showing a cross sectional view of the drive system switching clutch mechanism when oscillating the operation lever in a counterclockwise direction, and the operation lever.

When oscillating the operation lever 45 in a counterclockwise direction as shown in FIG. 11, from the two-wheel drive state, the forward tensile force of the inner wire 42 is canceled. The fork shaft 32 moves to the rear side based on the restoring force of the compression spring 36. The fork member 33 moves to the rear side together with the clutch member 25 by being pressed by the end surface of the large-diameter portion 32a of the fork shaft 32 so as to be engaged with the clutch gear tooth 17c in the side of the output shaft 12. The input shaft 11 and the output shaft 12 are connected so as to again switch to the four-wheel drive state.

In this case, when the fork member 33 moves to the front side, the limit sensor 39 is operated. It is thereby possible to detect the two-wheel drive state. When the limit switch 39 is not operated, it is in the four-wheel drive state.

The present drive system switching clutch mechanism 2 is operated as follows.

In the present embodiment, the operation lever 45 oscillates around the support shaft 46 between a pair of stoppers 50 and 51. A moving stopper 70 is arranged in a track along which the operation lever 45 oscillates between a pair of stoppers 50 and 51 so as to freely rise and set, refer to FIGS. 8 to 11.

Figure 12:
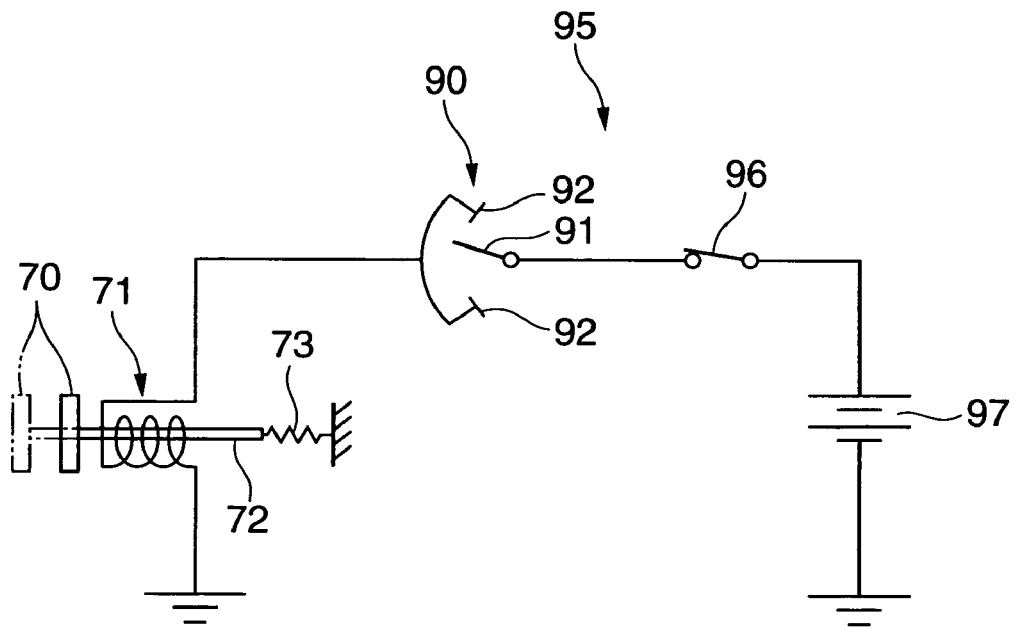
FIG. 12 is a circuit diagram showing a control circuit for controlling an electromagnetic solenoid.

The moving stopper 70 is firmly fixed to a leading end of a plunger 72 of an electromagnetic solenoid 71, refer to FIG. 12, and moves in a perpendicular direction to a plane along which the operation lever 45 is oscillated by driving the electromagnetic solenoid 71 so as to rise and set in the track along which the operation lever 45 oscillates.

In FIGS. 8 to 11, the moving stopper 70 protrudes to an upper side on a paper surface perpendicularly to the paper surface so as to appear in the track along which the operation lever 45 oscillates when the electromagnetic solenoid 71 is excited. The moving stopper retracts so as to retreat below the paper surface by the spring 73 when the electromagnetic solenoid 71 is demagnetized.

When the moving stopper 70 protrudes so as to appear in the track along which the operation lever 45 oscillates, the moving stopper 70 is positioned such as to hold the operation lever 45 brought into contact with any one of the stoppers 50 and 51 between the contact stoppers 50 and 51, so that the operation lever 45 can not be operated.

In other words, when the electromagnetic solenoid 71 is excited and the moving stopper 70 protrudes, the operation lever 45 can not be operated. When the electromagnetic solenoid 71 is demagnetized and the moving stopper 71 retracts, the operation lever 45 can be operated.

On the other hand, a steering angle sensor 90 for detecting an angle of steering is provided in a bar handle 80 of the present buggy-type four-wheeled vehicle.

Figure 13:
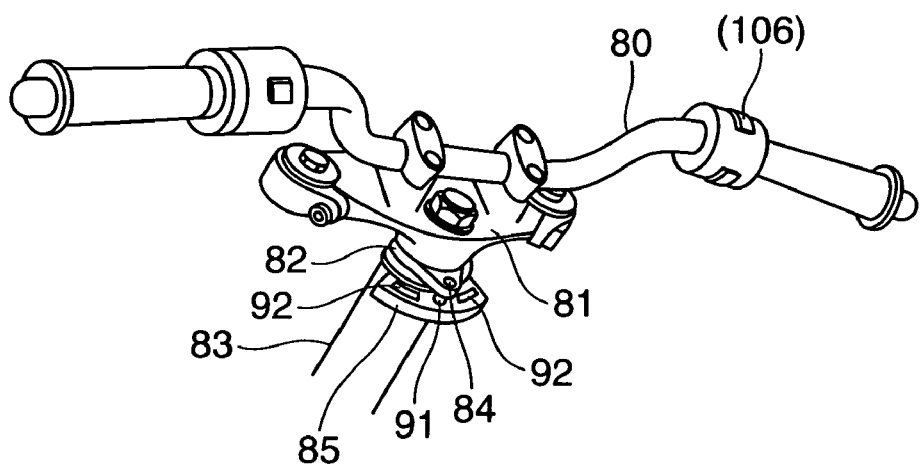
FIG. 13 is a perspective view of a handle portion in the present buggy four-wheeled vehicle.

As shown in FIG. 13, a steering shaft 82 extending to an obliquely lower side from a top bridge 81 fixing a center portion of the bar handle 80 is pivoted to a head pipe 83.

An oscillating piece 84 extends outward to a rear side from the steering shaft 82. An electric contact point 91 is provided in a leading end of the oscillating piece 84 so as to protrude to a lower side. The electric contact point 91 integrally oscillates by steering the bar handle 80.

A fixing piece 85 is provided below a track along which the leading end portion of the oscillating piece 84 oscillates, so as to develop and extend in a fan shape from the head pipe 83. A pair of circular arc electric contact pieces 92 and 92 are arranged symmetrically in right and left sides of an upper surface of the fixing piece 85.

Figure 14:
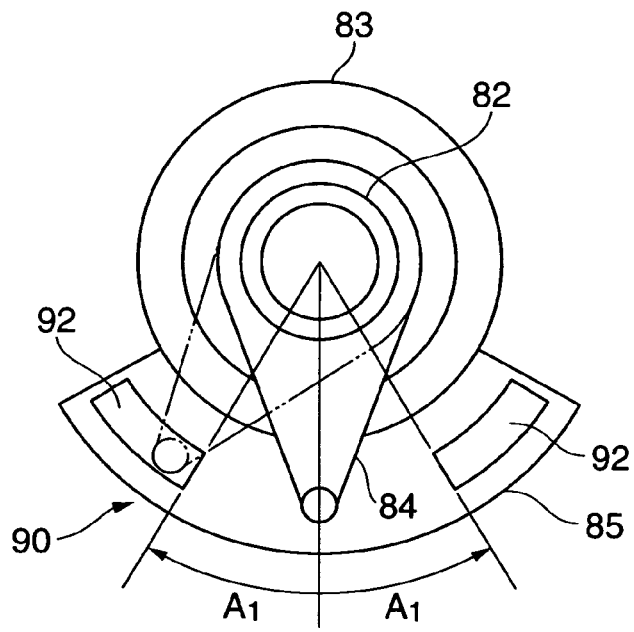
FIG. 14 is a view of a structure of a steering angle sensor.

As shown in FIG. 14, a pair of electric contact pieces 92 and 92 are arranged on the track of the electric contact point 91 oscillating in accordance with the steering operation. When the electric contact point 91 oscillates laterally over a certain angle, the electric contact point 91 is brought into contact with the electric contact piece 92.

The steering angle from the center to the right and left sides until the electric contact point 91 is brought into contact with the electric contact pieces 92 is set to an allowable steering angle $A_1$.

In other words, when the steering angle is within the allowable steering angle $A_1$ when the driver steers the bar handle 80, the electric contact point 91 is not brought into contact with the electric contact pieces 92. However, when the steering angle is over the allowable steering angle $A_1$, the electric contact point 91 is brought into contact with the electric contact point piece 92. The steering angle sensor 90 can detect that the bar handle 80 is steered over the allowable steering angle $A_1$.

A control circuit 95 controlling the electromagnetic solenoid 71 by using the steering angle sensor 90 is shown in FIG. 12.

The electromagnetic solenoid 71, the steering angle sensor 90, an ignition switch 96 and a power source 97 are connected in series.

The steering angle sensor 90 is structured such that a pair of electric contact pieces 92 and 92 are connected to a coil of the electromagnetic solenoid 71, and the electric contact point 91 is connected to one contact point of the ignition switch 96.

Accordingly, when the ignition switch 96 is turned on and an internal combustion engine is started, the electric contact point 91 of the steering angle sensor 90 is not brought into contact with the electric contact pieces 92 and 92 when the steering range of the bar handle 80 is within the allowable steering angle $A_1$. Thus, the electromagnetic solenoid 71 is in the demagnetized state and the moving stopper 70 retracts from the track along which the operation lever 45 oscillates. The drive system can be freely switched by operating the operation lever 45.

However, when the steering range of the bar handle 80 is over the allowable steering angle $A_1$, the electric contact point 91 of the steering angle sensor 90 is brought into contact with the electric contact pieces 92 and 92 and the electromagnetic solenoid 71 is excited. Accordingly, the moving stopper 70 appears in the track along which the operation lever 45 oscillates, thereby inhibiting the operation lever 45 from being operated.

Since the switching of the drive system is inhibited at the time when the vehicle turns such that the steering angle of the bar handle 80 is over the allowable steering angle $A_1$, the motion by the switching does not have an effect on the turning vehicle body. The vehicle can drive while always keeping the vehicle body in a good attitude, and in a dynamically balanced position while at the same time, stably maintaining the good attitude.

The present embodiment is structured such that the drive system is switched by manually operating the operation lever 45. Since the moving stopper 70 is arranged near the track along which the conventional operation lever 45 oscillates, and is driven by the electromagnetic solenoid 71, it is possible to easily add the drive system switching control mechanism at a later stage. It is also possible to significantly reduce cost.

Next, a description will be given of another embodiment in which the drive system is switched directly by an electromagnetic solenoid 100 with reference to FIGS. 15 to 17.

The drive transmission apparatus in accordance with the present embodiment is the same as drive transmission apparatus 1, and comprises the same drive system switching clutch mechanism 2 and the same rear wheel side differential mechanism 3. The same reference numerals are used.

Figure 15:
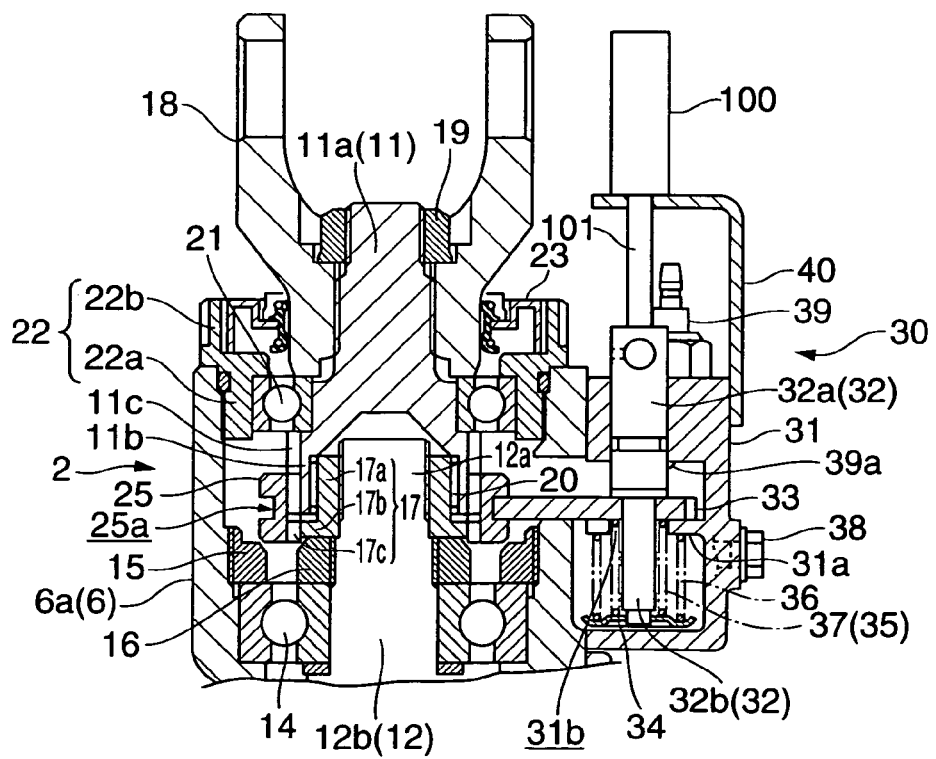
FIG. 15 is a cross sectional view of a drive system switching clutch mechanism in accordance with another embodiment.

However, in this case, the electromagnetic solenoid 100 is mounted to the bracket 40 in the drive system switching clutch mechanism 2 as shown in FIG. 15. A plunger 101 of the electromagnetic solenoid 100 is protruded to a rear side so as to connect to the fork shaft 32, and the electromagnetic solenoid 100 directly slides the fork shaft 32 so as to switch the drive system.

The electromagnetic solenoid 100 is controlled by a CPU 105 of a computer. The switching operation of the drive system is instructed, for example, by operating a changing switch 106 provided in a root portion of a grip in the bar handle 80 in FIG. 13.

Figure 16:
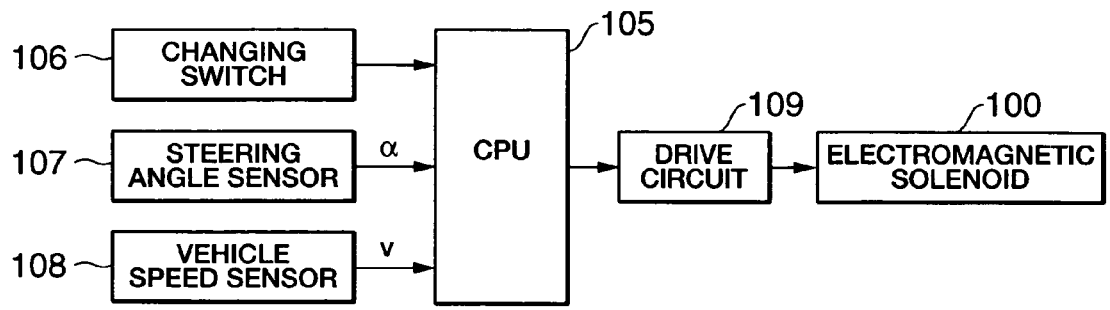
FIG. 16 is a schematic block diagram of a switching control system of the drive system switching clutch mechanism.

A schematic block diagram of the drive system switching control system by the CPU 105 is shown in FIG. 16.

A switch signal of the changing switch 106, a detection signal of a steering angle a of a steering angle sensor 107 and a signal of α vehicle speed V of a vehicle speed sensor 108 are inputs to the CPU 105. A drive system switching instructing signal is output from the CPU 105 to a drive circuit 109. The electromagnetic solenoid 100 is driven by the drive circuit 109.

The steering angle sensor 107 used here can continuously detect the steering angle of the bar handle. For example, analogue detects a turning angle of the steering shaft by a variable resistor so as to convert into a digital signal and output to the CPU 105.

Further, the vehicle speed sensor 108 also detects wheel speed of the automotive four-wheeled vehicle.

Figure 17:
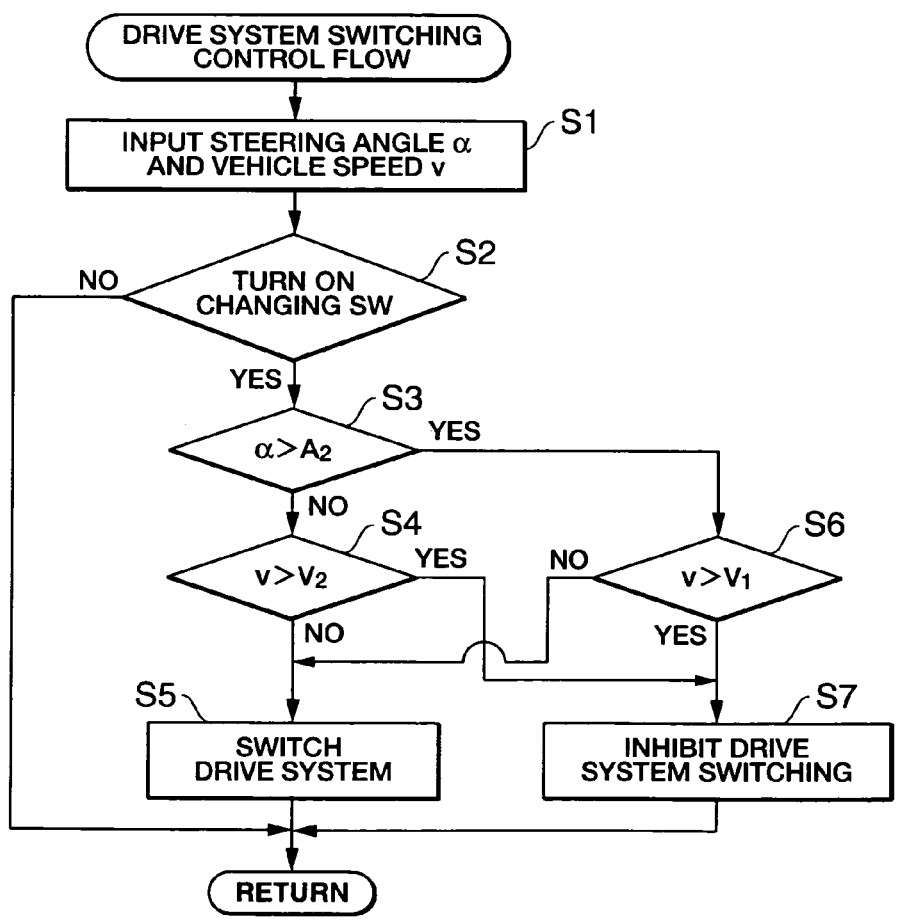
FIG. 17 is a flow chart showing a control procedure of the switching control system.

One example of the drive system switching control procedure in accordance with the control system is shown in a flow chart in FIG. 17 and is described.

First, the steering angle α and the vehicle speed V are inputted, step 1. Next, it is determined whether or not the changing switch 106 is turned on, step 2. The present routine is escaped if an off state is kept. The procedure goes to step 3 if the switch is turned on and the drive system switching is instructed.

In step 3, the steering angle α is compared with a predetermined angle $A_2$. If the steering angle α is smaller than the predetermined angle $A_2$, the procedure goes to step 4 and it is determined whether or not the vehicle speed V is larger than a predetermined speed $V_2$. If the vehicle speed V is smaller than the predetermined speed $V_2$, the drive system is switched by driving the electromagnetic solenoid 100, step 5. In this case, if the vehicle speed V is over the predetermined speed $V_2$, the drive system switching is inhibited, step 6, so that the drive system is not switched even when the changing switch 106 is turned on.

Further, when it is determined that the steering angle α is larger than the predetermined angle $A_2$ in step 3, the procedure goes to step 6. It is judged whether or not the vehicle speed v is larger than a predetermined speed $V_1(<V_2)$, and the drive system is switched if the vehicle speed v is smaller than the predetermined speed $V_1$, step 5. However, in this case, if the vehicle speed v is over the predetermined speed $V_1$, the drive system switching is inhibited, step 6.

Figure 18:
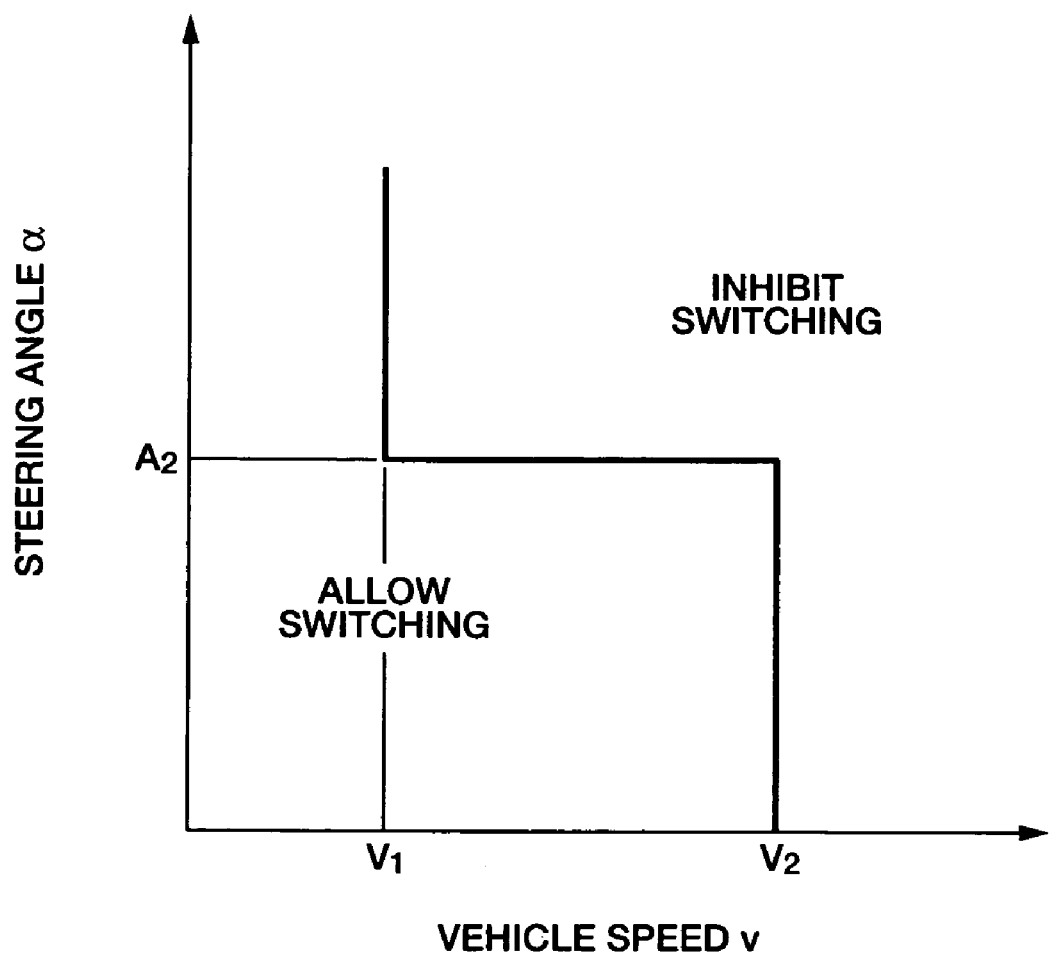
FIG. 18 is a map display of the drive system switching control in accordance with the control procedure.

The control can be displayed as a map using rectangular coordinate in which the vehicle speed v and the steering angle α constitute XY axes, as shown in FIG. 18.

In other words, when the vehicle speed v is low $(v<V_1)$, the drive system switching is not inhibited and the drive system can be switched all the time. However, when the vehicle speed v is a middle speed $(V_1<v<V_2)$, the drive system switching is inhibited when the steering angle α is larger than the predetermined angle $A_2$. The drive system switching is inhibited regardless of a magnitude of the steering angle α when the vehicle speed v is high $(v>V_2)$.

Accordingly, it is possible to change the condition inhibiting the drive system switching in such a manner that the motion by switching the drive system does not have an effect on the turning vehicle in correspondence to the degree of the vehicle speed. The vehicle can drive while always keeping the vehicle body in a good attitude, and in a dynamically balanced position while at the same time stably maintaining the good attitude.

Next, a description will be given of a method of previously determining an allowable steering angle $A_3$ for continuously switching the drive system in correspondence to the vehicle speed with reference to FIGS. 19 and 20.

A control system is the same as the control system by the computer. A map (v-α map) of the allowable steering angle $A_3$ in correspondence to the vehicle speed v shown in FIG. 20 is previously prepared and stored.

As shown in the v-α map, there is shown a downward-sloping curve that the allowable steering angle $A_3$ becomes smaller in proportion as the vehicle speed v becomes higher. Accordingly, the drive system is inhibited from being switched at a smaller steering angle in proportion as the vehicle speed is higher.

Figure 19:
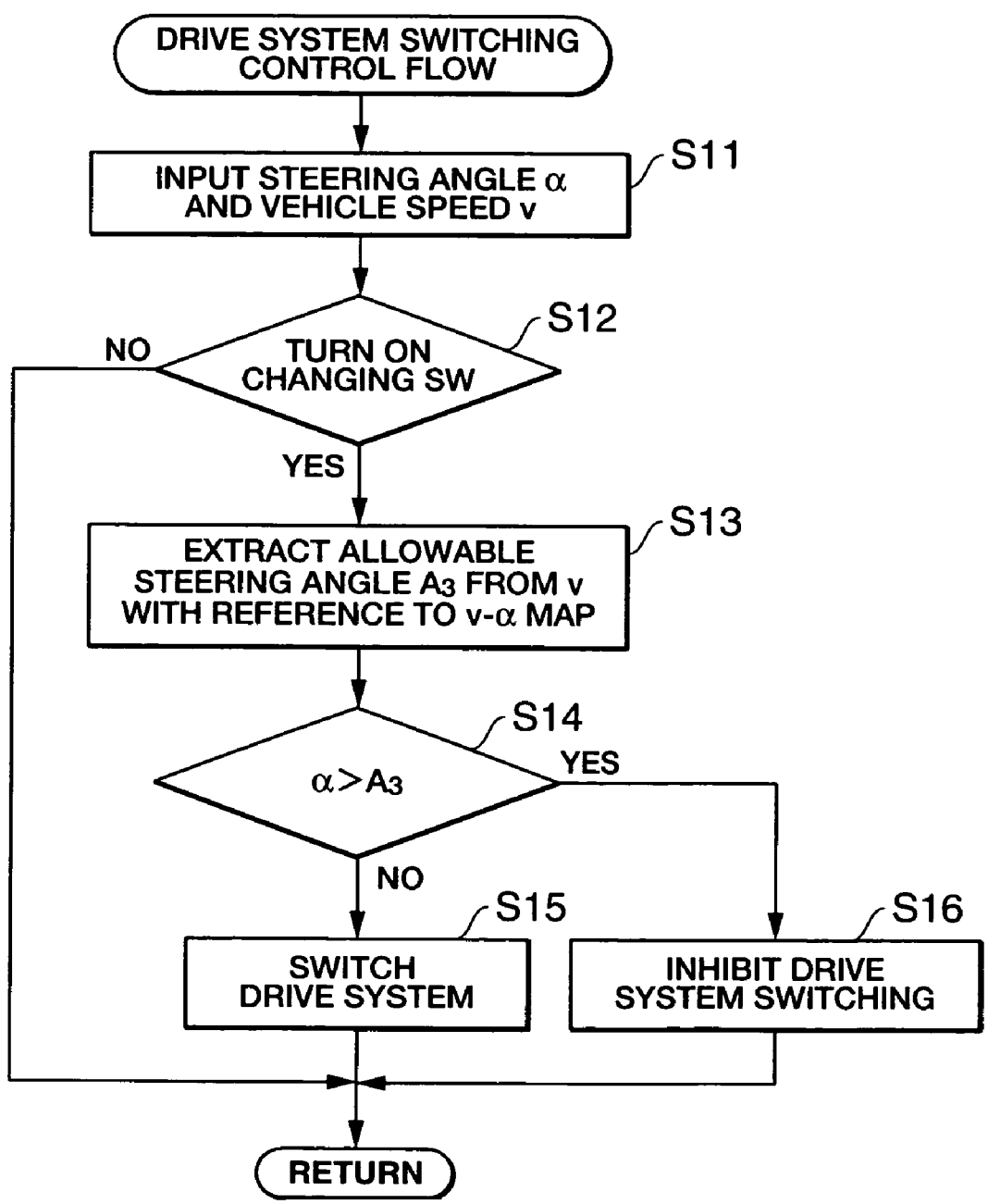
FIG. 19 is a flow chart showing another control procedure.

One example of the control procedure using the v-α map is shown in a flow chart in FIG. 19.

The steering angle α and the vehicle speed v are inputted, step 11. It is next determined whether or not the switch 106 is turned on, step 12, and the present routine is escaped if an off state is kept. The procedure goes to step 13 if the switch is turned on and the drive system switching is instructed.

Figure 20:
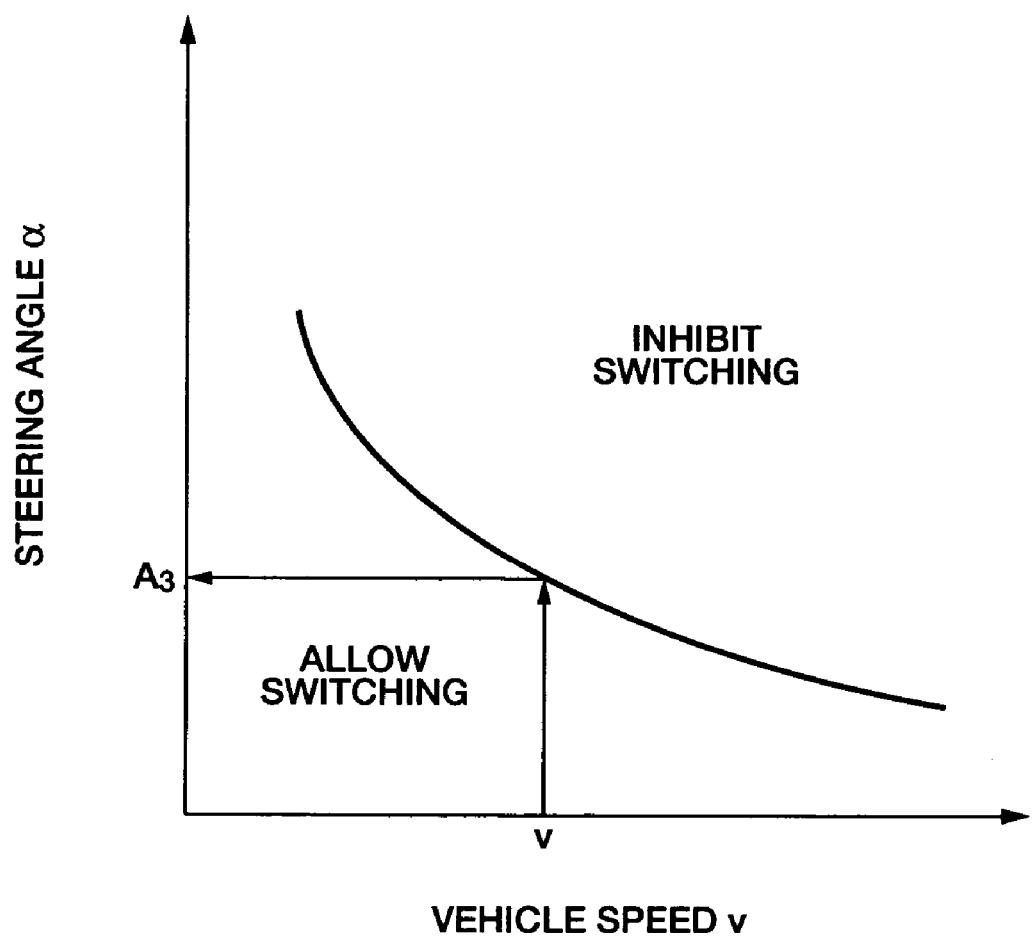
FIG. 20 is a map display of the drive system switching control in accordance with the control procedure.

In the step 13, the allowable steering angle $A_3$ is extracted from the vehicle speed v with reference to the v-α map in FIG. 20.

Further, the steering angle α is compared with the allowable steering angle $A_3$ extracted in the next step 14. If the steering angle α is within the allowable steering angle $A_3$, the procedure goes to step 15 so as to switch the drive system. If the steering angle α is over the allowable steering angle $A_3$, the procedure jumps to step 16 so as to inhibit the drive system from being switched and the switching is not executed.

As mentioned above, it is possible to widely allow the drive system switching within the range by which the motion by switching the drive system does not have an effect on the turning vehicle body so as to improve usability and achieve convenience, by suitably changing the allowable steering angle $A_3$ allowing the drive system switching in correspondence to the vehicle speed.

In this case, the present drive transmission apparatus may be integrally formed with the front wheel differential mechanism, or may be structured such that the drive system is controlled to be switched between the suitable drive transmission shafts so as to be controlled to be switched to the two-wheel drive or the four-wheel drive.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A drive system switching control method of a four-wheeled vehicle for switching two drive systems, a two-wheel drive and a four-wheel drive, comprising the steps of:
    detecting a steering angle; and
    inhibiting the drive system switching based only on whether the detected steering angle is over a predetermined angle.

2. A drive system switching control method of a four-wheeled vehicle for manual switching between two drive systems, a two-wheel drive and a four-wheel drive, comprising the steps of:
    detecting a steering angle and a vehicle speed;
    comparing the detected steering angle and vehicle speed with a corresponding relationship between the steering angle and the vehicle speed; analyzing a predetermined drive system switching so as to determine whether or not the manual drive system switching is allowed; and
    inhibiting only the drive system manual switching step from both two to four and four to two wheel drive modes it is determined that the drive system switching is not allowed.

3. A drive system switching control method of a four-wheeled vehicle for manual switching between two drive systems, a two-wheel drive and a four-wheel drive, comprising the step of:
    detecting a steering angle and a vehicle speed;
    comparing the detected vehicle speed with a relationship of an allowable steering angle; analyzing the drive system switching in correspondence to a predetermined vehicle speed so as to determine an allowable steering angle in correspondence to the vehicle speed; and
    inhibiting only the drive system manual switching step from both two to four and four to two wheel drive modes if the detected steering angle is over the determined allowable steering angle.

* * * * *